(12) United States Patent
Hatanaka et al.

(10) Patent No.: US 7,969,147 B2
(45) Date of Patent: Jun. 28, 2011

(54) ROTATION ANGLE DETECTING DEVICE INCLUDING MULTIPLE MAGNETIC SENSOR ELEMENTS

(75) Inventors: Shinji Hatanaka, Okazaki (JP); Kenji Takeda, Okazaki (JP); Shigetoshi Fukaya, Toyota (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 413 days.

(21) Appl. No.: 12/060,496

(22) Filed: Apr. 1, 2008

(65) Prior Publication Data

US 2008/0284421 A1 Nov. 20, 2008

(30) Foreign Application Priority Data

May 18, 2007 (JP) .................................. 2007-133380

(51) Int. Cl.
*G01B 7/30* (2006.01)
(52) U.S. Cl. .................................. 324/207.25; 702/151
(58) Field of Classification Search .............. 324/207.25
See application file for complete search history.

(56) References Cited

U.S. PATENT DOCUMENTS

| | | | |
|---|---|---|---|
| 6,861,837 B1 | 3/2005 | Shimizu et al. | |
| 6,894,487 B2 | 5/2005 | Kunz-Vizenetz | |
| 7,218,100 B1 * | 5/2007 | Matsumoto et al. | 324/207.25 |
| 7,420,363 B2 * | 9/2008 | Hatanaka et al. | 324/207.25 |
| 7,436,172 B2 * | 10/2008 | Matsumoto et al. | 324/174 |
| 2007/0194786 A1 | 8/2007 | Hatanaka et al. | |

FOREIGN PATENT DOCUMENTS

| | | |
|---|---|---|
| JP | 08-068606 | 3/1996 |
| JP | 2002-243500 | 8/2002 |
| JP | 2003-075108 | 3/2003 |
| JP | 2003-202244 | 7/2003 |
| JP | 2006-138778 | 6/2006 |

OTHER PUBLICATIONS

Japanese Office Action dated Jan. 20, 2009, issued in corresponding Japanese Application No. 2007-13380, with English translation.
Japanese Office Action dated Apr. 7, 2009, issued in corresponding Japanese Application No. 2007-133380, with English translation.

* cited by examiner

*Primary Examiner* — Patrick J Assouad
*Assistant Examiner* — David M. Schindler
(74) *Attorney, Agent, or Firm* — Nixon & Vanderhye P.C.

(57) ABSTRACT

A rotation angle detecting device includes a signal generator, a magnetic rotor and a rotation angle calculating unit that calculates a rotation angle $\theta$ of the rotor based on the output signals of the signal generator. The signal generator includes a magnetic rotor that has a permanent magnet and a shaft connectable with the rotating object and at least three magnetic sensor elements disposed in the magnetic field to generate a plurality of output signals when the rotor rotates. The rotation angle calculating unit calculates a first candidate of the rotation angle $\theta$ from a first pair of the three output signals, examines whether the first candidate of the rotation angle $\theta$ is normal or not and calculates a next candidate of the rotation angle $\theta$ from another pair of the three output signals if the first candidate of the rotation angle $\theta$ is not normal, examines whether the next candidate of the rotation angle $\theta$ is normal or not, repeats the above two steps until a next candidate of the rotation angle $\theta$ is judged normal, and outputs one of the first and next candidates of the rotation angle $\theta$ as a formal rotation angle if it is judged normal.

14 Claims, 7 Drawing Sheets

ROTATION ANGLE DETECTING DEVICE INCLUDING MULTIPLE MAGNETIC SENSOR ELEMENTS

CROSS REFERENCE TO RELATED APPLICATION

The present application is based on and claims priority from Japanese Patent Applications 2007-133380, filed May 18, 2007, the contents of which are incorporated herein by reference.

BACKGROUND OF THE INVENTION

1. Field of the Invention

The present invention relates to a rotation angle detecting device that detects the rotation angle of a rotating object.

2. Description of the Related Art

JP-A-2003-75108 discloses a prior art rotation angle detecting device that is constructed of a disk-shaped permanent magnet and two or three magnetic sensors. The magnetic sensors are respectively disposed at portions to confront the permanent magnet so as to generate output signals according to the magnetic field strength. A rotation angle of a rotating object is calculated by a certain arithmetic expression based on the output signals of the magnetic sensors. However, it is impossible for such a prior art rotation angle detecting device to detect a rotation angle if one of the magnetic sensors fails.

SUMMARY OF THE INVENTION

Therefore, an object of the invention is to provide an improved rotation angle detecting device that can detect a rotation angle even if one of the magnetic sensors fails, without increasing the number of the magnetic sensors.

According to a feature of the invention, a rotation angle detecting device includes a housing, a signal generator and a rotation angle calculating unit that calculates a rotation angle $\theta$ of the rotor based on the output signals. The signal generator includes a rotor having a permanent magnet, a shaft connectable with a rotating object and three magnetic sensor elements. The rotation angle calculating unit is configured to carry out the following steps: calculating a first candidate of the rotation angle $\theta$ from a first pair of the three output signals; examining whether the first candidate of the rotation angle $\theta$ is normal or not; calculating a next candidate of the rotation angle $\theta$ from another pair of the three output signals if the first candidate of the rotation angle $\theta$ is not normal; examining whether the next candidate of the rotation angle $\theta$ is normal or not; repeating the above two steps until a next candidate of the rotation angle $\theta$ is judged normal; and outputting one of the first and next candidates of the rotation angle $\theta$ as a formal rotation angle if it is judged normal.

In the above rotation angle detecting device, the signal generator is configured to generate the output signals in sinusoidal shapes; and the rotation angle calculating unit is configured to provide $\sin \theta$ and $\cos \theta$ from one of the first and next candidates of the rotation angle $\theta$ to calculate the rotation angle $\theta$ from arctan (tan $\theta$). In addition, the rotation angle calculating unit examines the normality of the rotation angle by comparing $\sin \theta$, $\cos \theta$ and the rotation angle $\theta$ with preset values. The permanent magnet may provide the magnet field extending in a direction perpendicular to the rotation axis of the rotor, and the magnetic sensor elements respectively have sensing directions that are perpendicular to the rotation axis of the rotor and different from each other. In this arrangement, the permanent magnet is preferably disposed inside the rotor around the rotation axis.

The rotation angle detecting device may further include means for changing amplitude of the output signals as the rotor rotates, and the rotation angle calculating unit is arranged to calculate the number of turns of the rotor based on the amplitude of the output signals. The means for changing amplitude may include a mechanism of shifting the permanent magnet relative to the magnetic sensor elements to change strength of the magnetic field as the rotor rotates. For this purpose, the permanent magnet may have a conical inner surface the diameter of which linearly increases or decreases as the inner surface shifts in parallel to the rotation axis. The mechanism of shifting the permanent magnet may include a sleeve and a pair of male and female screws formed on portions of the sleeve and the rotor that are in contact with each other.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A couple of preferred embodiments of the invention will be described with reference to the appended drawings.

A rotation angle detecting device 1 according to the first embodiment of the invention will be described with reference to FIG. 1-FIG. 4.

Figure 1:
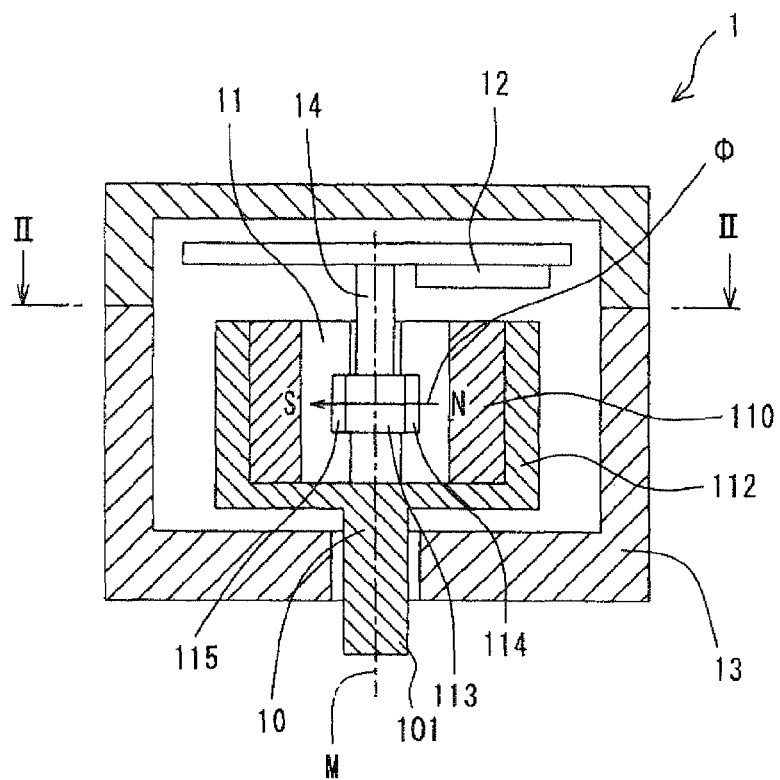
FIG. 1 is a longitudinal cross-section of a rotation angle detecting device according to the first embodiment of the invention.
Figure 2:
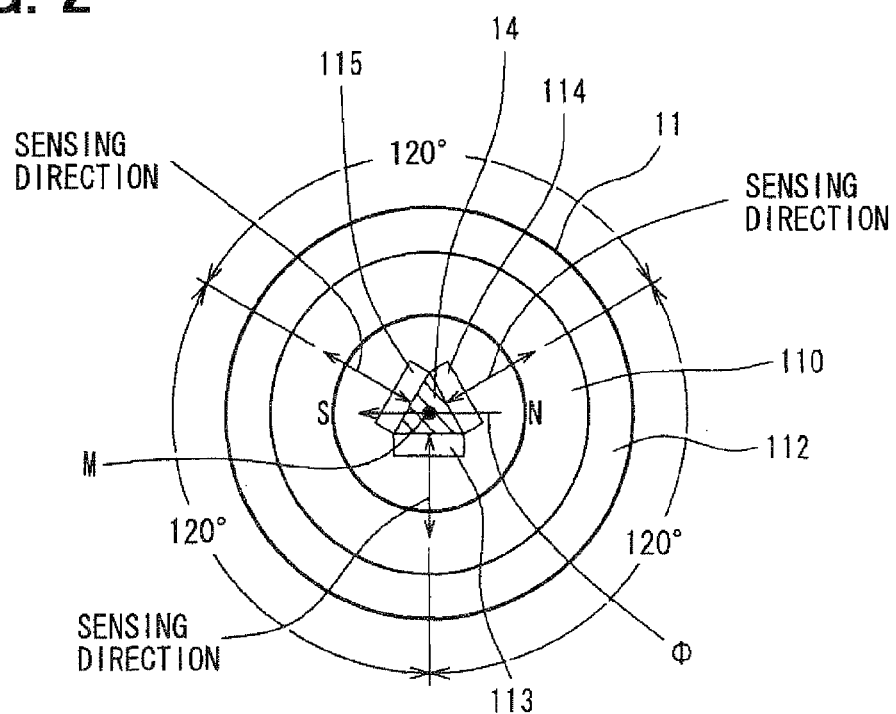
FIG. 2 is a schematic cross-sectional plan view of a signal generator of the rotation angle detecting device illustrated in FIG. 1 cut along line II-II.
Figure 3:
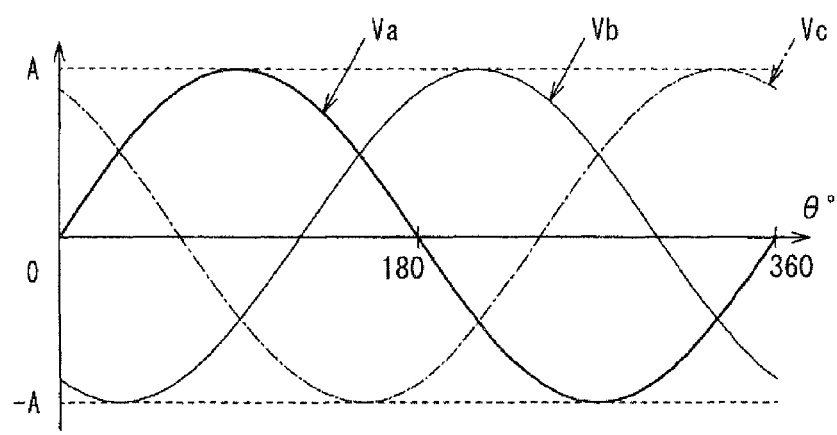
FIG. 3 is a graph showing wave shapes of the output signals of three magnetic sensor elements.

As shown in FIGS. 1 and 2, the rotation angle detecting device 1 includes a signal generator 11, a rotation angle calculating unit 12, a housing 13 and a support member 14.

The signal generator 11 is comprised of a rotor 10 and three magnetic sensors 113-115. In other words, the signal generator 11 is comprised of the permanent magnet 110, the yoke 112 and the magnetic sensor elements 113-115.

The rotor 10 is rotatably supported by the housing 13 and includes a permanent magnet 110, a yoke 112 and a rotary shaft 101 connected with a rotating object (not shown). The permanent magnet 110 is a cylindrical member made of ferrite that is magnetized in a direction perpendicular to the rotation axis M of the rotor 10. Accordingly, a magnetic pole N is formed on one portion of the inside surface of the cylindrical permanent magnet 110 and a magnetic pole S is formed on another portion of the same inside surface that confronts the magnetic pole N with the rotation axis being between the two poles. That is, a magnetic field φ is formed to extend along a radial direction as shown in an arrow in FIGS. 1 and 2.

The yoke 112 has a cylindrical magnetic member that surrounds the permanent magnet 110 at an axial end of the rotor 10 and a disk-like bottom member from which the rotary shaft 101 projects to the other axial end so as to rotate about the rotation axis M. The magnetic sensor elements 113-115 are Hall IC elements, which are fixed to the support member 14 to be disposed at a space surrounded by the permanent magnet 110 around the rotation axis M. Each of the sensor elements 113-115 has a sensing direction that is perpendicular to the rotation axis M and 120 degrees in angle different from those of other sensor elements 113-115.

The signal generator 11 generates three output signals, each of which has a phase that is different from the others and not anti-phase of others, according to the rotation angle θ that changes between 0 degree and 360 degrees.

When the rotor 10 rotates, the sensor elements 113-115 respectively output signals Va, Vb, Vc, which are expressed by the following expression E1.

$$Va = A \sin\theta$$

$$Vb = A \sin(\theta + 120°)$$

$$Vc = A \sin(\theta - 120°), \quad [E1]$$

where:
A is an amplitude of the output signals; and θ is a rotation angle of the rotor 10 between 0° and 360°.

The rotation angle calculation unit 12 is comprised of a microcomputer to calculate the rotation angle θ from two of the output signals Va, Vb, Vc that are selected in turn. The rotation angle calculation unit 12 examines if the calculated rotation angle θ is correct or not before finally providing the rotation angle θ. The rotation angle calculation unit 12 converts the output signals Ma, Vb, for example, to digital data and calculates Vab by the following expression E2

$$Vab = Va/\tan 60° + Vb/\sin 60° = A \cos\theta \quad [E2]$$

Further, the rotation angle θ or the rotor 10 is calculated from Vab and Va by the following expression E3.

$$\begin{aligned}\theta &= \arctan(\tan\theta) \\ &= \arctan(A\cos\theta / A\sin\theta) \\ &= \arctan(Vab/Va)\end{aligned} \quad [E3]$$

Figure 4:
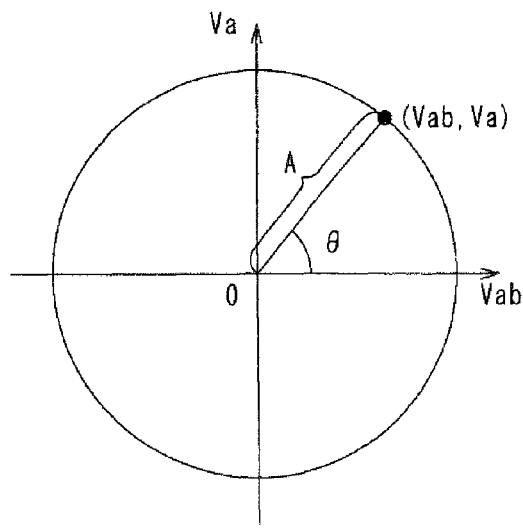
FIG. 4 is a graph showing a relation between a rotation angle $\theta$, an output signal Va in the vertical axis and a signal Vab in horizontal axis.

When the output signals Va, Vb are normal, a point (Vab, Va) that is defined by Vab and Va can be depicted on a circle having whose radius is the amplitude A in rectangular coordinates, as shown in FIG. 4. The angle between the straight line that joins the point (Vab, Va) and the origin 0 of the rectangular coordinates and the horizontal Vab axis becomes the rotation angle θ of the rotor 10. That is, there is a correspondence relationship among Vab, Va and the rotation angle θ. Therefore, by determining whether a proper correspondence relationship exists among Vab, Va and the rotation angle θ, the rotation angle calculation unit 12 examines whether the rotation angle θ is normal or not based on the relationship between Vab, Va and the rotation angle θ. The rotation angle calculation unit 12 compares Vab. Va and the rotation angle θ with preset expected values that indicate the proper correspondence relationship among Vab, Va and the rotation angle θ. Thereby, the rotation angle calculation unit 12 determines whether the rotation angle is normal or not. In the above, the expected values are set to values that are indicative of the correspondence relationship among Vab, Va and the rotation angle θ and that are represented by circle locus, as shown in FIG. 4. Therefore, based on sine value (A sin θ) and cosine value (A cos θ) each corresponding to the rotation angle θ, and based on the rotation angle θ, it is determined whether the rotation angle θ is normal.

Likewise, the rotation angle calculation unit 12 also converts the output signals Vb, Vc to digital data and calculates Vbc. Then the rotation angle θ is calculated and examined in the same manner as above to examine whether it is normal or not. Likewise, the rotation angle calculation unit 12 also calculate Vca and the rotation angle θ from the output signals Vc, Va and examines the rotation angle θ in the same manner as above.

If the magnetic sensor element 113 fails, the output signal Va is judged not normal, while the output signals Vb and Vc are judged normal. In this case, the rotation angle calculation unit 12 provides the rotation angle θ based on the output signals Vb and Vc.

A rotation angle detecting device 2 according to the second embodiment of the invention will be described with reference to FIG. 5-FIG. 11.

Figure 5:
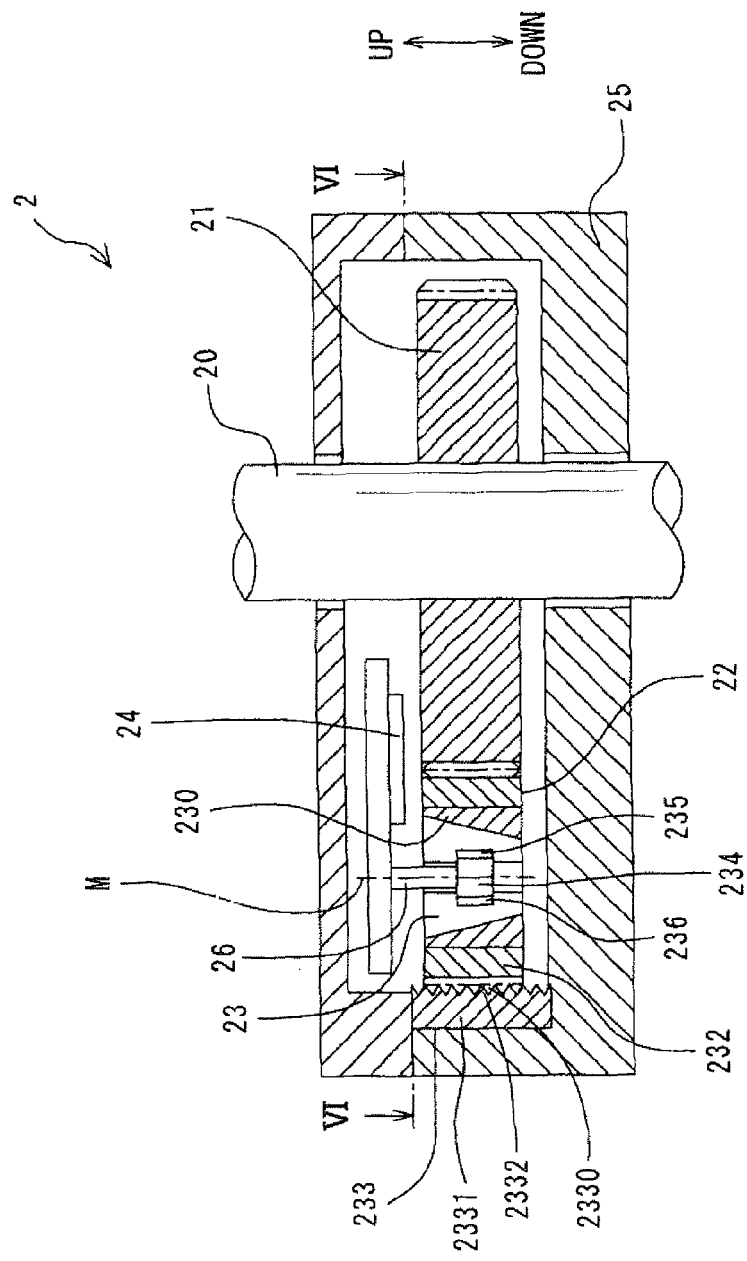
FIG. 5 illustrates a longitudinal cross-section of a rotation angle detecting device according to the second embodiment of the invention.
Figure 6:
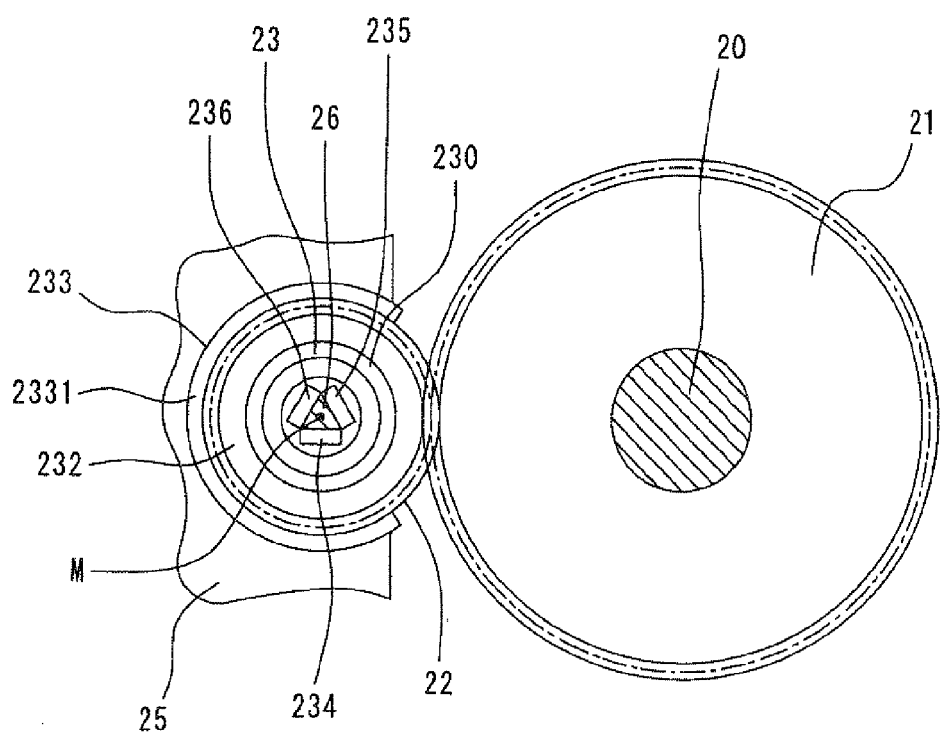
FIG. 6 is a schematic cross-sectional plan view of a signal generator and a gear of the rotation angle detecting device shown in FIG. 5 cut along line VI-VI.
Figure 7:
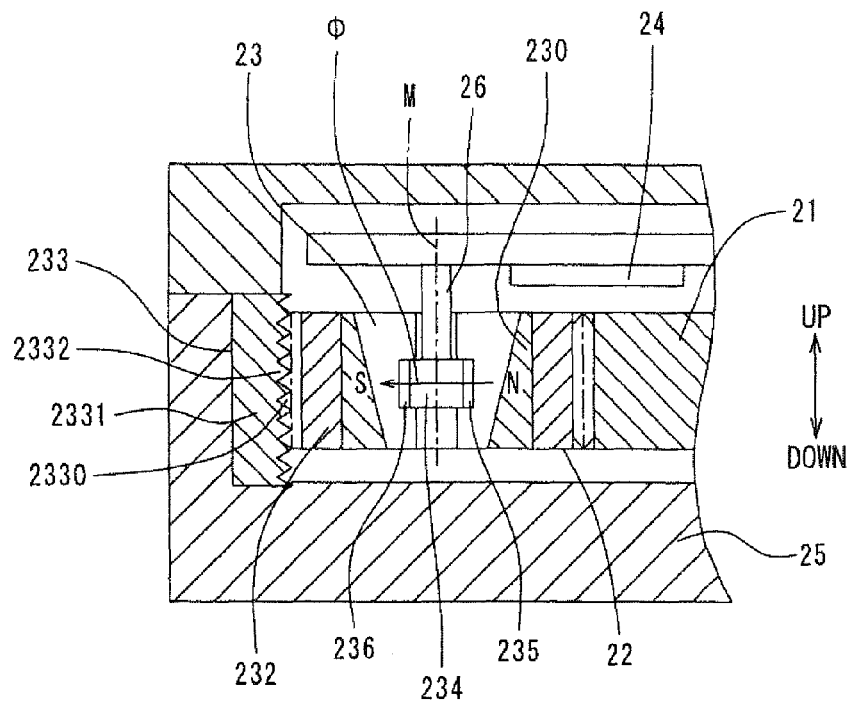
FIG. 7 is an enlarged view of a longitudinal cross-section of the signal generator of the rotation angle detecting device illustrated in FIG. 5.
Figure 8:
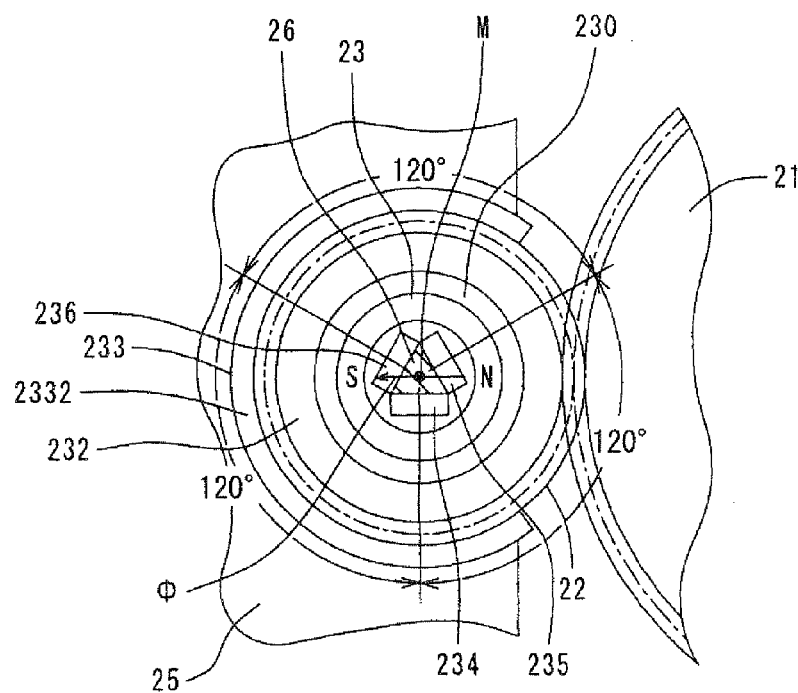
FIG. 8 is an enlarged plan view of the signal generator illustrated in FIG. 6.
Figure 9:
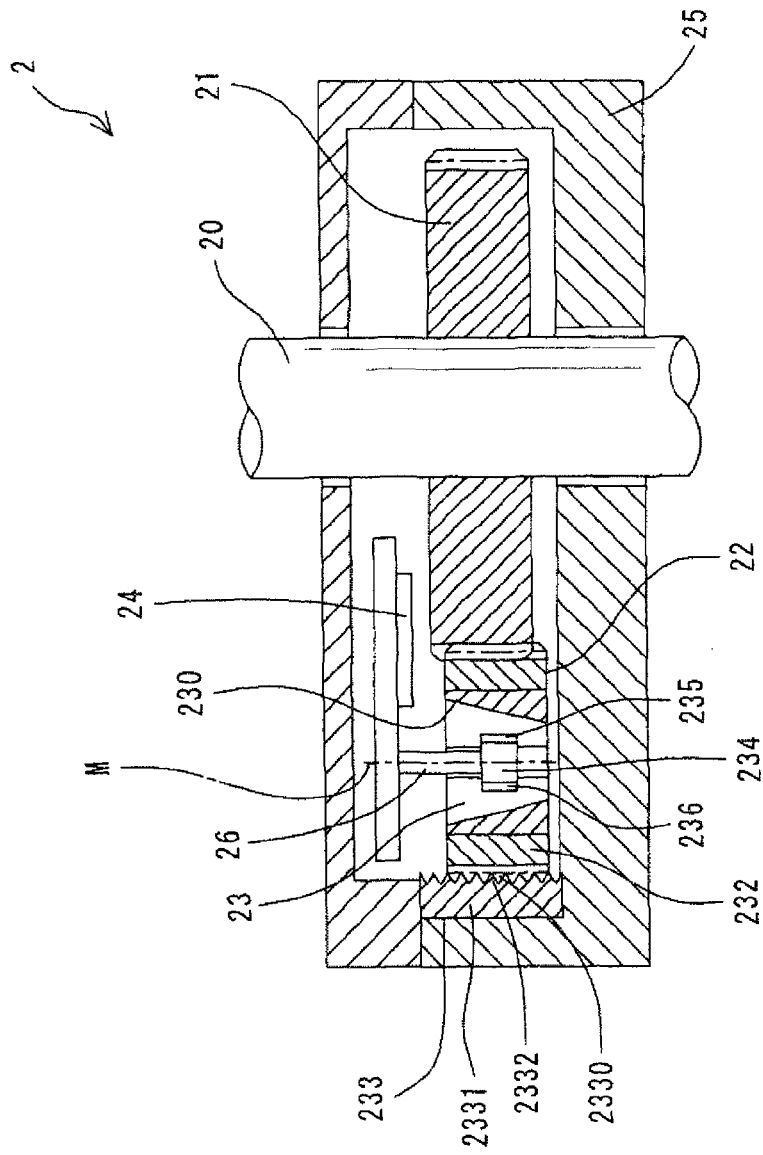
FIG. 9 is a longitudinal cross-section of the rotation angle detecting device according to the second embodiment of the invention in operation.

As shown in FIG. 5, the rotation angle detecting device 2 includes a shaft 20, a signal generator 23, a rotation angle calculating unit 24, a housing 25 and a support member 26. The signal generator 23 is comprised of a gear 21, a rotor 22 and three magnetic sensors 234-236. The shaft 20 carries the gear 21 at the middle thereof and is connected with a rotating object at one end so as to rotate the gear 21 when the rotating object rotates. The shaft 20 is rotatably supported by the housing 25. The rotor 22 is also rotatably supported by the housing via a sleeve 2331. The rotor 22 includes a cylindrical permanent magnet 230, a cylindrical yoke 232 and a yoke shifting mechanism 233. The cylindrical yoke 232 has gear teeth on the outer periphery thereof in engagement with the gear 21.

The signal generator 23 generates three output signals, each of which has a phase that is different from the others and not anti-phase of others, according to the rotation angle θ of the rotor 22 between 0 degree and an angle much larger than 360 degrees, such as 720 degrees (two turns) or 1080 degrees (three turns).

The permanent magnet 230 is a cylindrical member made of ferrite that is magnetized in a direction perpendicular to the rotation axis M of the rotor 22. Accordingly, a magnetic pole N is formed on one portion of the inside surface of the cylindrical permanent magnet 110 and a magnetic pole S is formed on another portion of the same inside surface that confronts the magnetic pole N across the rotation axis, which is disposed between the two poles. As a result, a magnetic field φ is formed in a radial direction as shown in an arrow in FIGS. 7 and 8.

The yoke 232 is a cylindrical magnetic member that surrounds the permanent magnet 230. The permanent magnet 230 is fixed to the inner surface of the yoke 232. The permanent magnet 230 has a conical inner surface the diameter of which linearly increases as the inner surface shifts upward in parallel to the rotation axis M.

The yoke shifting mechanism 233 shifts the yoke 232 up or down as the rotor 22 rotates in one or the other direction. The yoke shifting mechanism 233 is comprised of a sleeve 2331 that has a female screw 2332 and a male screw 2330 that is formed on a portion of the gear teeth of the yoke 232 in engagement with the female screw 2332 of the sleeve 2331. The sleeve 2331 is an arc-shaped member fixed to the cylindrical inner surface of the housing 25 that confronts the yoke 232 so as to rotatably support the rotor 22.

Figure 10:
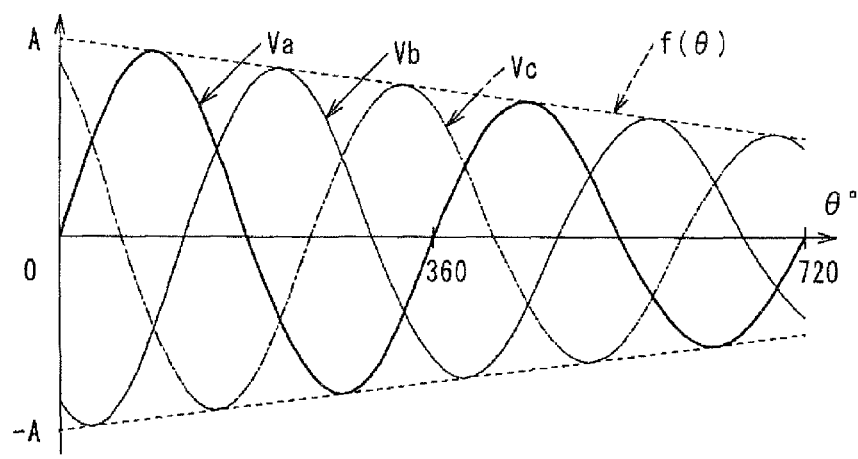
FIG. 10 is a graph showing wave shapes of the output signals of three magnetic sensor elements of the rotation angle detecting device according to the second embodiment of the invention.

The magnetic sensor elements 234-236 are Hall IC elements, which are fixed to the support member 26 to be disposed at a space surrounded by the permanent magnet 230 around the rotation axis M. Each of the sensor elements 234-236 has a sensing direction that is perpendicular to the rotation axis M and 120 degrees in angle different from those of other sensor elements 234-236. When the rotor 22 rotates, the rotor 22 shifts downward to decrease the strength of the magnetic field and the sensor elements 234-236 respectively output signals Va, Vb, Vc, which are shown in FIG. 10 and expressed by the following expression E4.

$Va = f(\theta)\sine \theta$ $Vb = f(\theta)\sine(\theta+120°)$ $Vc = f(\theta)\sine(\theta-120°),$  [E4]

where:
θ is a rotation angle of the rotor 22; and f(θ) is an amplitude of the output signals that changes as the rotation angle θ changes.

The rotation angle calculation unit 24 is comprised of a microcomputer to calculate the rotation angle θ from two of the output signals Va, Vb, Vc that are selected in turn. The rotation angle calculation unit 12 examines if the calculated rotation angle θ is correct or not before finally providing the rotation angle θ. The rotation angle calculation unit 24 converts the output signals Va, Vb, for example, to digital data and calculates Vab by the following expression E5

$Vab = Va/\tan 60° + Vb/\sin 60° = f(\theta)\cos \theta$  [E5]

Further, the rotation angle θ1 of the rotor 22, which is a rotation angle θ less than 360 degrees, is calculated from Vab and Va by the following expression E6.

$$\theta = \arctan(\tan\theta)  \quad [E6]$$
$$= \arctan(f(\theta)\cos\theta / f(\theta)\sin\theta)$$
$$= \arctan(Vab/Va)$$

The rotation angle calculation unit 24 calculates the number of turns from the amplitude f(θ) of one of the output signals Va and Vb. The rotation angle θ of the rotor 22 is calculated from the one-turn rotation angle θ1 and the number of turns.

Figure 11:
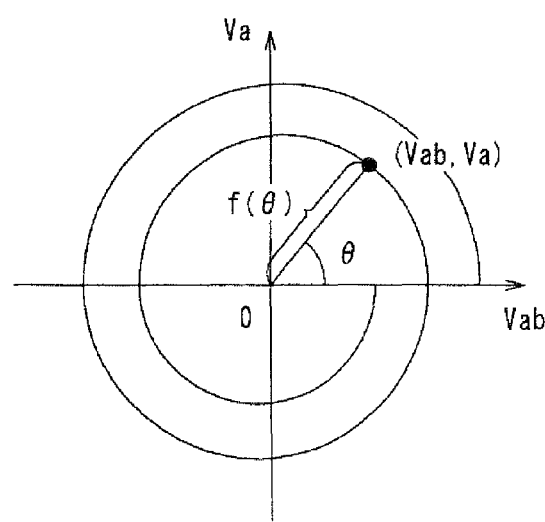
FIG. 11 is a graph showing a relation between a rotation angle $\theta$, an output signals Va in the vertical axis and a signal Vab in horizontal axis.

When the output signals Va, Vb are normal, a point (Vab, Va) that is defined by Vab and Va can be depicted on a whirl having a variable distance f(θ) from the origin in rectangular coordinates, as shown in FIG. 11. The angle between the straight line that joins the point and the origin of the rectangular coordinates and the horizontal Vab axis becomes the rotation angle θ of the rotor 22. The rotation angle calculation unit 24 judges whether the rotation angle θ is normal or not based on the relationship between Vab, Va and the rotation angle θ.

The rotation angle calculation unit 24 also converts the output signals Vb, Vc to digital data and calculates Vab. Then the rotation angle θ is calculated and examined in the same manner as above to examine whether it is normal or not. The rotation angle calculation unit 24 also calculate Vca and the rotation angle θ from the output signals Vc, Va and examines the rotation angle θ in the same manner as above.

If the magnetic sensor element 234 fails, the rotation angle calculation unit 24 judges that the output signal Va is not normal, while it judges that the output signals Vb and Vc are normal. In this case, the rotation angle calculation unit 12 provides the rotation angle θ based on the output signals Vb and Vc.

A modification of the rotation angle detecting device 2 according to the first embodiment of the invention will be described below.

In this modified embodiment, the three magnetic sensor elements 113-115 are disposed so that each of the sensing direction is in an angle other than 120 degrees different from those of other sensor elements 113-115. For example, if the phase difference between the output signal Va' of the sensor element 113 and the output signal Vb' of the sensor element 114 is α°+90°, the following expressions E7 and E8 may be given, in which A' is an amplitude of the output signals, and θ' is a rotation angle of the rotor.

$$X' = \begin{bmatrix} Vab' \\ Va' \end{bmatrix} = \begin{bmatrix} A'\cos\theta' \\ A'\sin\theta' \end{bmatrix} = R2 \cdot G \cdot R1 \cdot X \quad [E7]$$

$$X = \begin{bmatrix} Vb' \\ Va' \end{bmatrix} = \begin{bmatrix} A'\sin\{\theta' + (90° + \alpha)\} \\ A'\sin\theta' \end{bmatrix}$$

$$R1 = \begin{bmatrix} \cos[-\pi/4] & -\sin[-\pi/4] \\ \sin[-\pi/4] & \cos[-\pi/4] \end{bmatrix}$$

$$G = \begin{bmatrix} \dfrac{\sin[\pi/4]\cos[\pi/4 - \alpha/2]}{\sin[\pi/6]\cos\alpha} & 0 \\ 0 & \dfrac{\sin[\pi/4]\sin[\pi/4 - \alpha/2]}{\sin[\pi/6]\cos\alpha} \end{bmatrix}$$

$$R2 = \begin{bmatrix} \cos[\pi/4 - \alpha/2] & -\sin[\pi/4 - \alpha/2] \\ \sin[\pi/4 - \alpha/2] & \cos[\pi/4 - \alpha/2] \end{bmatrix}$$

$\theta' = \arctan(\tan\theta') = \arctan(A'\cos\theta / A'\sin\theta) = \arctan(Vab'/Va')$  [E8]

If four or more magnetic sensor elements are available, an accurate rotation angle can be provided even if two or more sensor elements fail.

The magnetic sensor elements can be replaced by other sensor elements that provide sinusoidal output signals, such as optical sensor elements.

The shape of permanent magnet can be replaced by other than cylindrical shape, such as a rectangular shape if it provides a magnetic field that is perpendicular to the rotation axis of the rotor.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotation angle detecting device comprising:
a housing;
a signal generator including a magnetic rotor that forms a magnetic field and at least three magnetic sensor elements disposed in the magnetic field to respectively generate at least three output signals when the magnetic rotor rotates, said magnetic rotor having a permanent magnet forming the magnetic field, a shaft rotatably supported by the housing; and
a rotation angle calculating unit that calculates a rotation angle $\theta$ of the rotor based on the output signals, wherein the rotation angle calculating unit is configured to:
make a calculation of a first candidate of the rotation angle $\theta$ of the rotor from a first pair of the at least three output signals;
make a judgment as to whether the first candidate of the rotation angle $\theta$ of the rotor is normal or not;
make a next calculation of a next candidate of the rotation angle $\theta$ of the rotor from another pair of the at least three output signals if the first candidate of the rotation angle $\theta$ of the rotor is not normal;
make a next judgment as to whether the next candidate of the rotation angle $\theta$ of the rotor is normal or not;
repeat the next calculation and the next judgment until the next candidate of the rotation angle $\theta$ of the rotor is judged normal; and
output one of the first and next candidates of the rotation angle $\theta$ of the rotor as a formal rotation angle if it is judged normal.

2. A rotation angle detecting device as in claim 1, wherein:
the signal generator is configured to generate the output signals in sinusoidal shapes; and
the rotation angle calculating unit is configured to provide $\sin \theta$ and $\cos \theta$ to calculate the rotation angle $\theta$ of the rotor from $\arctan (\tan \theta)$.

3. A rotation angle detecting device as in claim 2, wherein the rotation angle calculating unit examines normality of the rotation angle $\theta$ of the rotor by comparing $\sin \theta$, $\cos \theta$ and the rotation angle $\theta$ of the rotor with preset values.

4. A rotation angle detecting device as in claim 1, wherein:
the permanent magnet provides the magnet field extending in a direction perpendicular to a rotation axis of the rotor; and
the magnetic sensor elements respectively have sensing directions that are perpendicular to the rotation axis of the rotor and different from each other.

5. A rotation angle detecting device as in claim 4, wherein the permanent magnet is disposed inside the rotor around the rotation axis of the rotor.

6. A rotation angle detecting device as in claim 1, further comprising means for changing amplitude of the output signals as the rotor rotates,
wherein the rotation angle calculating unit calculates a number of turns of the rotor based on the amplitude of the output signals.

7. A rotation angle detecting device as in claim 1, wherein the rotor further has a cylindrical yoke surrounding the permanent magnet.

8. A rotation angle detecting device as in claim 6, wherein the means for changing amplitude comprises a mechanism for shifting the permanent magnet relative to the magnetic sensor elements to change strength of the magnetic field as the rotor rotates.

9. A rotation angle detecting device as in claim 1, the permanent magnet provides the magnetic field extending in a direction perpendicular to a rotation axis of the rotor;
the permanent magnet is shifted in a direction parallel to the rotation axis of the rotor in accordance with rotation of the rotor by a mechanism for shifting the permanent magnet; and
the magnetic sensor elements respectively have sensing directions that are perpendicular to the rotation axis of the rotor and different from each other.

10. A rotation angle detecting device as in claim 9, wherein:
the permanent magnet is located to surround the rotation axis of the rotor and has an inside surface; and
the permanent magnet has a pair of magnetic poles at the inside surface thereof across the rotation axis of the rotor.

11. A rotation angle detecting device as in claim 10, wherein:
the permanent magnet has a conical inner surface as the inside surface thereof, so that a distance between the pair of magnetic poles in the direction perpendicular to the rotation axis of the rotor monotonically increases or decreases in the direction parallel to the rotation axis of the rotor.

12. A rotation angle detecting device as in claim 11, wherein the mechanism for shifting the permanent magnet comprises a sleeve, and a pair of male and female screws formed on portions of the sleeve and the rotor that are in contact with each other.

13. A rotation angle detecting device as in claim 12, wherein:
the rotor further has a cylindrical yoke surrounding the permanent magnet.

14. A rotation angle detecting device as in claim 13, the shaft is integral with the cylindrical yoke.

* * * * *